Feb. 20, 1934.   W. B. NOLD   1,947,489
ENGINE MOUNTING
Filed March 31, 1933   2 Sheets-Sheet 1
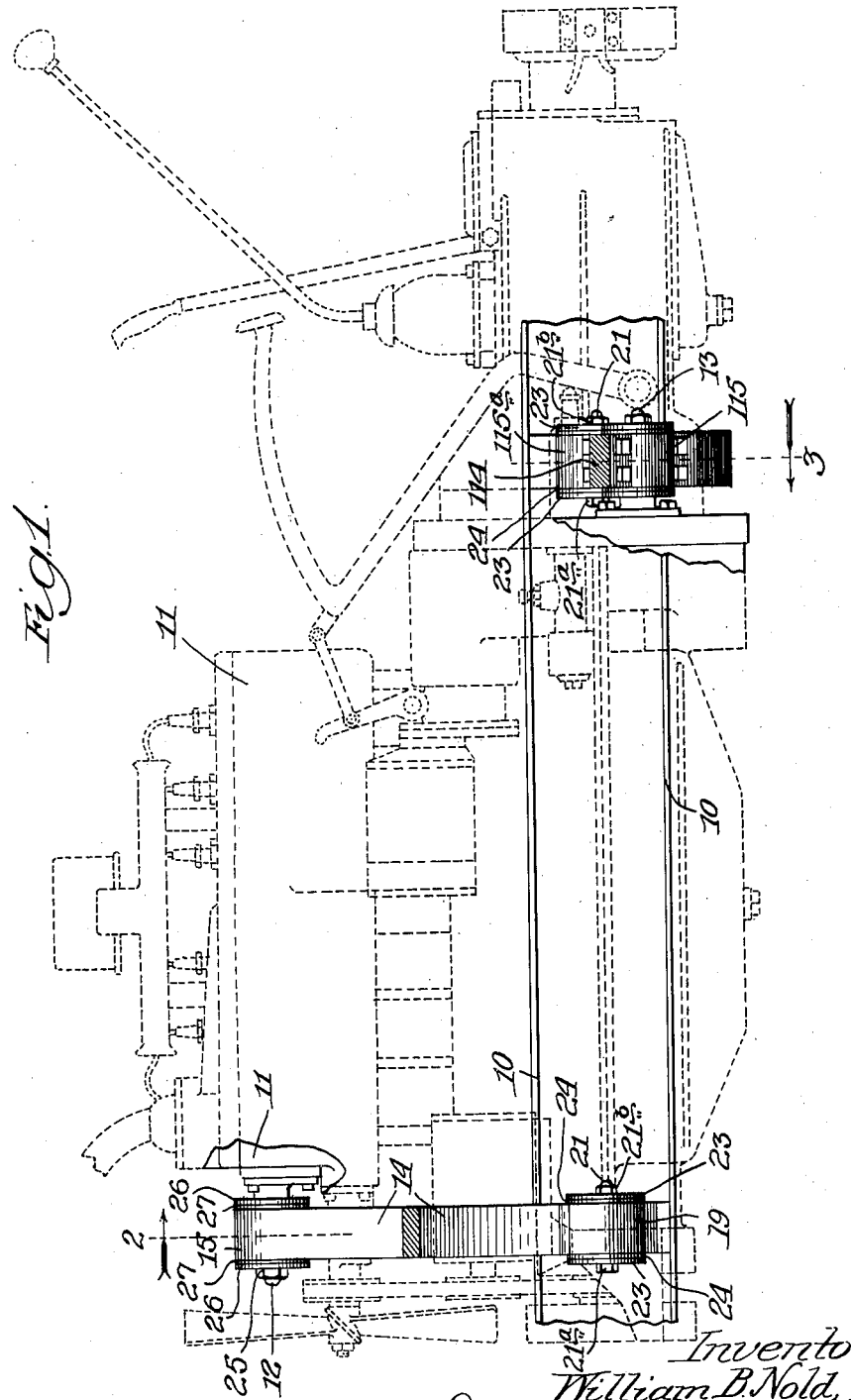

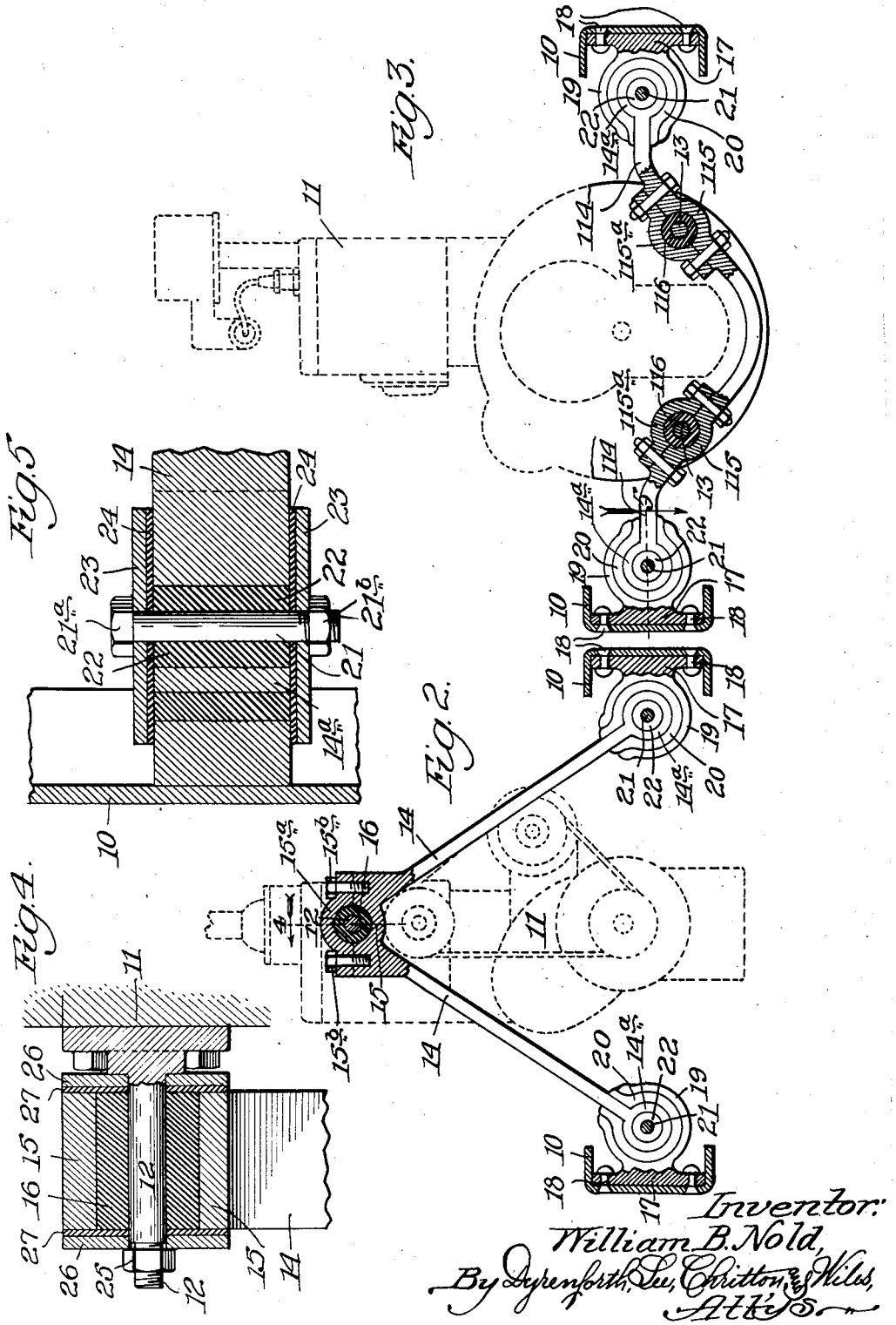

Patented Feb. 20, 1934

1,947,489

UNITED STATES PATENT OFFICE 1,947,489

ENGINE MOUNTING

William B. Nold, Chicago, Ill.

Application March 31, 1933. Serial No. 663,829

4 Claims. (Cl. 248—14.2)

This invention relates to improvements in engine mountings and, more especially, to such a mounting particularly applicable for the engines of motor vehicles. For example, the invention may be applied to the mounting of an internal combustion engine in a motor vehicle, such as a passenger car, truck, bus, or the like.

Among the features of my invention is an improved mounting for an engine that absorbs vibrations, contributes flexibility, and furnishes resiliency or yield in the transmission of power.

My invention also assists in proper alinement of the motor in its mounting and also facilitates installation and removal of a motor from a vehicle.

Other features and advantages of my invention will appear more fully as I proceed with my specification.

In that form of device embodying the features of my invention shown in the accompanying drawings—

Figure 1 is a view in side elevation, partly in section; Fig. 2 is a view taken as indicated by the line 2 of Fig. 1; Fig. 3 is a view taken as indicated by the line 3 of Fig. 1; Fig. 4 is a view taken as indicated by the line 4 of Fig. 2; and Fig. 5 is a view taken as indicated by the line 5 of Fig. 3.

As shown in the drawings, the channels 10, 10 may indicate the opposite side members of a vehicle frame or chassis. For the purpose of illustrating my invention, it is enough to show only this part of a motor vehicle. 11 may indicate an engine, for example, an internal combustion engine of conventional type mounted between the frame members 10, 10.

In general, it may be stated that as here shown, the engine or motor 11 is carried by a single trunnion or lug at the forward end and two trunnions or lugs at the rear end. It is obvious, however, that the number, spacing and arrangement, of supporting trunnions may be varied as desired. As here shown, the supporting trunnion on the motor at the forward end is indicated by 12 and the two at the rear end by 13, 13.

For supporting the trunnion 12 at the forward end, I provide a bridging member 14 in the shape of an inverted V. 15 indicates a rubber-lined socket carried by this bridging member, the rubber lining therein being indicated by 16. The socket 15 is preferably made accessible by providing the removable upper half or cap 15ª held in position by the machine screws 15ᵇ, 15ᵇ. The bridging member at the rear end of the motor is indicated by 114 and this is provided with two sockets 115, 115, similar to the socket 15 and adapted to support the two lugs 13, 13. These sockets are likewise provided with rubber linings 116, 116 and removable tops 115ª, 115ª.

The bridging member 114 is supported from the frame members 10, 10 in the following manner. Since the support at each end is similar, it is necessary to describe but one.

17 indicates a bracket attached to the frame member 10 by the rivets 18, 18. This bracket carries a split tube 19 provided with a rubber lining 20. The bridging member 14 has each end provided with an enlarged tubular end 14ª lying inside of the rubber lining 20, the bridging member itself extending through the split in the tube 19. 21 represents a bolt with a rubber cover 22 extending through the tubular end 14ª of the bridging member. This bolt is provided with a head 21ª and nut 21ᵇ. Under the head and nut I prefer to provide metal washers 23 seated on rubber washers or gaskets 24.

The construction of the support of the ends of the bridging member 114 is best shown in Fig. 5. Since the support of the ends of the bridging member 14 is similar, this view will also represent sections through the ends of the bridging member 14 in which case the reference numerals would all be the same, except that 14 would be substituted for 114.

Figure 4 represents a section through the support for the trunnion 12 at the forward end of the motor. I prefer to provide the end of this trunnion with a nut 25 and also may provide at the ends of the trunnion metal washers 26 seated on rubber washers 27, 27. The supports for the trunnions 13 are the same and, consequently, Fig. 4 may also represent sections through such supports.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. An engine mounting, including; a pair of brackets adapted for attachment to opposite side members of a vehicle frame; a split tube carried by each bracket; a rubber lining in each split tube; a bridging member provided with enlarged ends lying in the rubber linings in the split tubes, said bridging member extending through the splits in said tubes; and a rubber-lined socket carried by the bridging member and adapted to support therein a trunnion carried by an engine.

2. An engine mounting, including; a pair of brackets adapted for attachment to opposite side members of a vehicle frame; a split tube carried by each bracket; a rubber lining in each split tube; a bridging member provided with tubular ends lying in the rubber linings in the split tubes, said bridging member extending through the splits in said tubes; and a rubber-lined socket carried by the bridging member and adapted to support therein a trunnion carried by an engine.

3. An engine mounting as claimed in claim 2, in which a rubber-jacketed bolt extends through each of the tubular ends of the bridging member.

4. An engine mounting as claimed in claim 2, in which a rubber-jacketed bolt extends through each of the ends of the bridging member, the ends of said bolt being provided with metal washers seated on rubber washers.

WILLIAM B. NOLD.